(12) United States Patent
Acker et al.

(10) Patent No.: US 6,761,988 B1
(45) Date of Patent: Jul. 13, 2004

(54) FUEL CELL SYSTEM WITH ACTIVE METHANOL CONCENTRATION CONTROL

(75) Inventors: William P. Acker, Rexford, NY (US); George C. McNamee, Loudonville, NY (US); William W. Dailey, Loudonville, NY (US)

(73) Assignee: MTI MicroFuel Cells Inc., Albany, NY (US)

(*) Notice: Subject to any disclaimer, the term of this patent is extended or adjusted under 35 U.S.C. 154(b) by 108 days.

(21) Appl. No.: 09/718,148

(22) Filed: Nov. 21, 2000

(51) Int. Cl.[7] .................................................. H01M 8/04
(52) U.S. Cl. ............................................ 429/23; 429/22
(58) Field of Search ..................................... 429/22, 23

(56) References Cited

U.S. PATENT DOCUMENTS

| | | | |
|---|---|---|---|
| 4,673,624 A | 6/1987 | Hockaday | 429/41 |
| 4,810,597 A | 3/1989 | Kumagai et al. | 429/22 |
| 4,904,548 A | 2/1990 | Tajima | |
| 5,523,177 A | 6/1996 | Kosek et al. | 429/40 |
| 5,573,866 A | 11/1996 | Van Dine et al. | 429/13 |
| 5,599,638 A | 2/1997 | Surampudi et al. | 429/33 |
| 5,631,099 A | 5/1997 | Hockaday | 429/30 |
| 5,723,228 A | 3/1998 | Okamoto | 429/12 |
| 5,759,712 A | 6/1998 | Hockaday | 429/30 |
| 5,766,786 A | 6/1998 | Fleck et al. | |
| 5,773,162 A | 6/1998 | Surampudi et al. | 429/39 |
| 5,795,668 A | 8/1998 | Banerjee | 429/33 |
| 5,916,699 A | 6/1999 | Thomas et al. | 429/3 |
| 5,945,231 A | 8/1999 | Narayanan et al. | 429/30 |
| 5,992,008 A | 11/1999 | Kindler | 29/730 |
| 6,214,484 B1 * | 4/2001 | Hauer | 429/13 |
| 6,296,964 B1 | 10/2001 | Ren et al. | |
| 6,383,670 B1 | 5/2002 | Edlund et al. | |
| 6,527,943 B1 * | 3/2003 | Zhang et al. | |

OTHER PUBLICATIONS

"Fuel Cell", 1992 Fuel Cell Seminar, Program and Abstracts, pp. 233–236, 461–464, (Nov.).
"Miniaturized Fuel Cells for Portable Power", Helen L. Maynard and Jeremy P. Meyers, Lucent Technologies, 2000, (No month).
"Pocket–size PEMs", Paul Sharke, Mechanical Engineering, (No Date).
"Polymer Electrolyte Fuel Cells as Potential Power Sources for Portable Electronic Devices", Shinshon Gottesfeld and Mahlon S. Wilson, pp. 487–517, (No Date).
Ron, et al., Methanol Cross–Over in Direct Methanol Fuel Cells, Electronic and Electrochemical Materials and Devices, MST–11, MS–D429, Los Alamos National Laboratory, NM, (No Date).

* cited by examiner

Primary Examiner—John S. Maples
(74) Attorney, Agent, or Firm—Cesari and McKenna, LLP

(57) ABSTRACT

A direct methanol fuel cell (DMFC) system in which, in response to changes in the output power level of the cell, the concentration of methanol supplied to the anode is actively regulated. As a result, cross-over of methanol through the cell's membrane electrolyte is minimized, and operating efficiency is maintained over a wide dynamic range of output power levels.

22 Claims, 6 Drawing Sheets

FUEL CELL SYSTEM WITH ACTIVE METHANOL CONCENTRATION CONTROL

BACKGROUND OF THE INVENTION

1. Field of the Invention

The present invention relates generally to the field of fuel cells and, more specifically, to a direct methanol fuel cell system in which active control of the concentration of methanol at a critical point within the cell minimizes cross-over of methanol through the cell's membrane.

2. Background Information

Fuel cells are devices in which an electrochemical reaction is used to generate electricity. A variety of materials may be suitable for use as a fuel, depending upon the materials chosen for the components of the cell. Organic materials, such as methanol or formaldehyde, are attractive choices for fuels due to their high specific energies.

Fuel cell systems may be divided into "reformer based" (i.e., those in which the fuel is processed in some fashion before it is introduced into the cell) or "direct oxidation" in which the fuel is fed directly into the cell without internal processing. Most currently available fuel cell systems are of the reformer-based type and their fuel processing requirement limits their application to relatively large applications relative to a direct oxidation system.

An example of the direct oxidation system is the direct methanol fuel cell system or DMFC. In a DMFC, the electrochemical reaction at the anode is a conversion of methanol and water to $CO_2$, $H^+$ and $e^-$. The hydrogen ions flow through a membrane electrolyte to the cathode, while the free electrons flow through a load which is normally connected between the anode and cathode providing power to the load. At the cathode, oxygen reacts with hydrogen ions and free electrons to form water.

Conventional DMFCs suffer from a problem which is well known to those skilled in the art: cross-over of methanol from the anode to the cathode through the membrane electrolyte, which causes significant loss in efficiency. Cross-over occurs because of the high solubility of methanol in the membrane electrolyte. In order to minimize cross-over, and thereby minimize the loss of efficiency, the concentration of methanol in the fuel feed stream is kept low (e.g., below 1M) by dilution with water. However, dilution of the methanol introduces other disadvantages: (1) the fuel cell's construction becomes more complicated and costly because of the structures and processes needed to store and manage the water; and (2) the energy per unit volume of the fuel cell, which is a critical factor in terms of the fuel cell's potential commercial applications, is reduced.

SUMMARY OF THE INVENTION

In brief summary, the present invention provides a direct methanol fuel cell system in which, in response to changes in the output power level of the cell, the concentration of methanol supplied to the anode is actively controlled, thereby minimizing methanol cross-over and maintaining efficiency over a wide operating range. Mechanisms for controlling the methanol concentration are preferably constructed using microelectromechanical system (MEMS) fabrication techniques which enable the control mechansim to be readily integrated with the fuel cell's structure.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
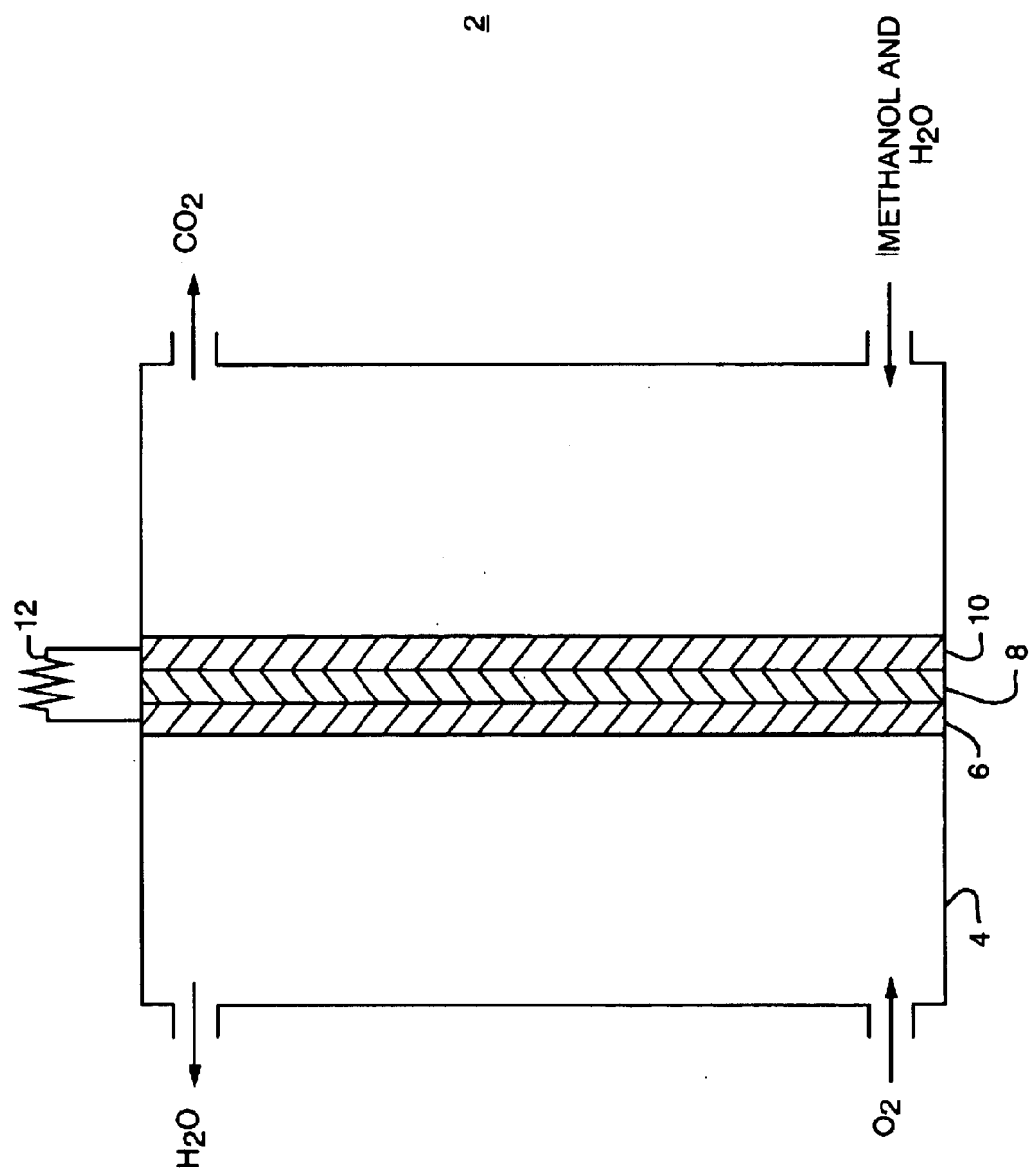
FIG. 1 is a block diagram of a direct methanol fuel cell known in the prior art.

FIG. 1 shows a conventional direct methanol fuel cell 2 in which a housing 4 encloses a cathode 6, a membrane electrolyte 8 and an anode 10. A load 12 is connected across cathode 6 and anode 10. Methanol and water are introduced into the anode side of housing 4 while oxygen is introduced into the cathode side of the housing. The source of the oxygen is preferably ambient air, but it should be understood that other sources could be used. As a result of the reactions at the anode and cathode, free electrons flow from anode 10 through load 12 to cathode 6, while hydrogen ions flow from anode 10 through membrane electrolyte 8 to cathode 6. So long as the reactions continue, a current is maintained through load 12.

Figure 2:
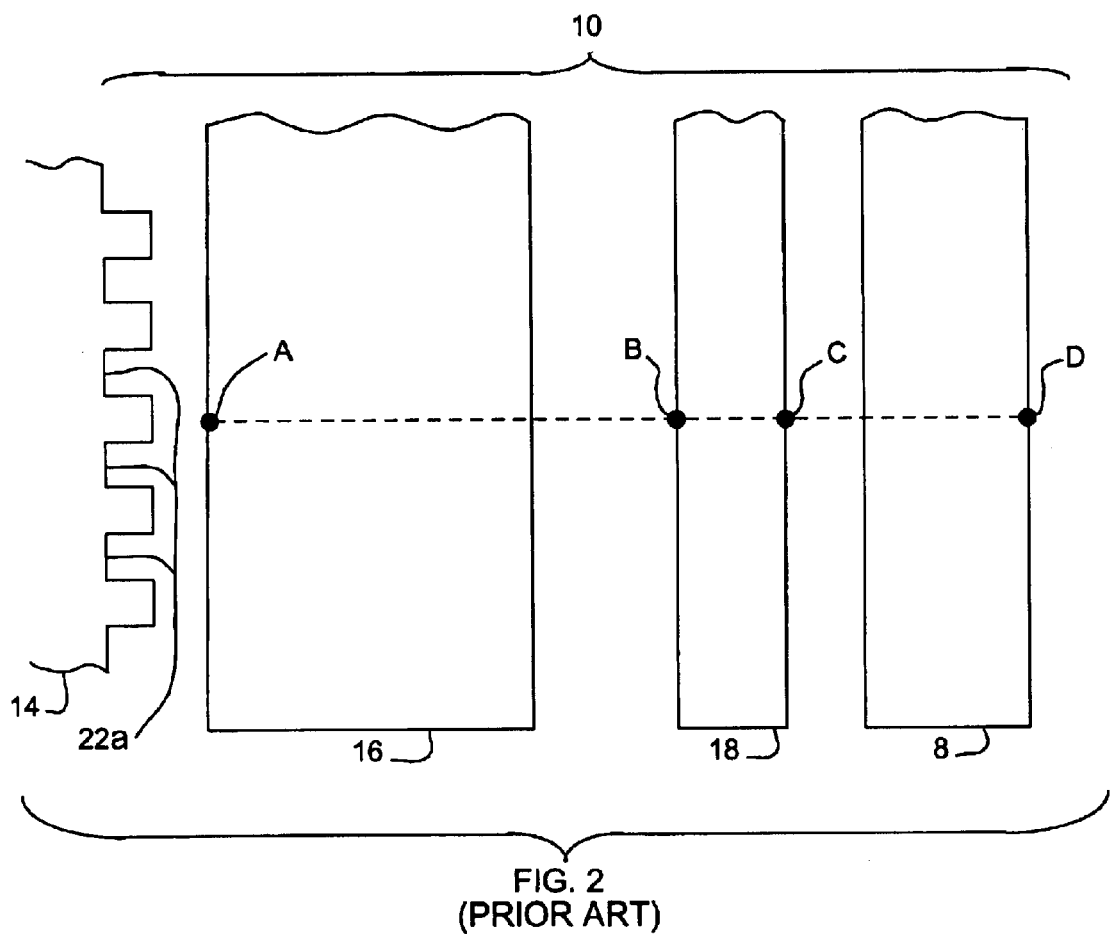
FIG. 2 is an exploded view showing details of the internal construction of the fuel cell of FIG. 1.

FIG. 2 illustrates certain details the internal construction of anode 10, the components of which are shown in exploded form for enhanced clarity. One face of a flow plate 14 is formed as a series of grooves or channels 22a through which a methanol-water mixture (not shown) passes. Flow plate 14 is normally in direct contact with one face of a gas diffusion layer (GDL) 16. The opposite face of GDL 16 is in direct contact with one face of an electrode 18. Similarly, the opposite face of electrode 18 is in direct contact with one side of membrane electrolyte 8. Four points of interest within anode 10 are denoted by the reference letters A, B, C and D, respectively. Points A, B and C represent interfaces between components and point D represents the cathode side of membrane electrolyte 8.

Figure 3A:
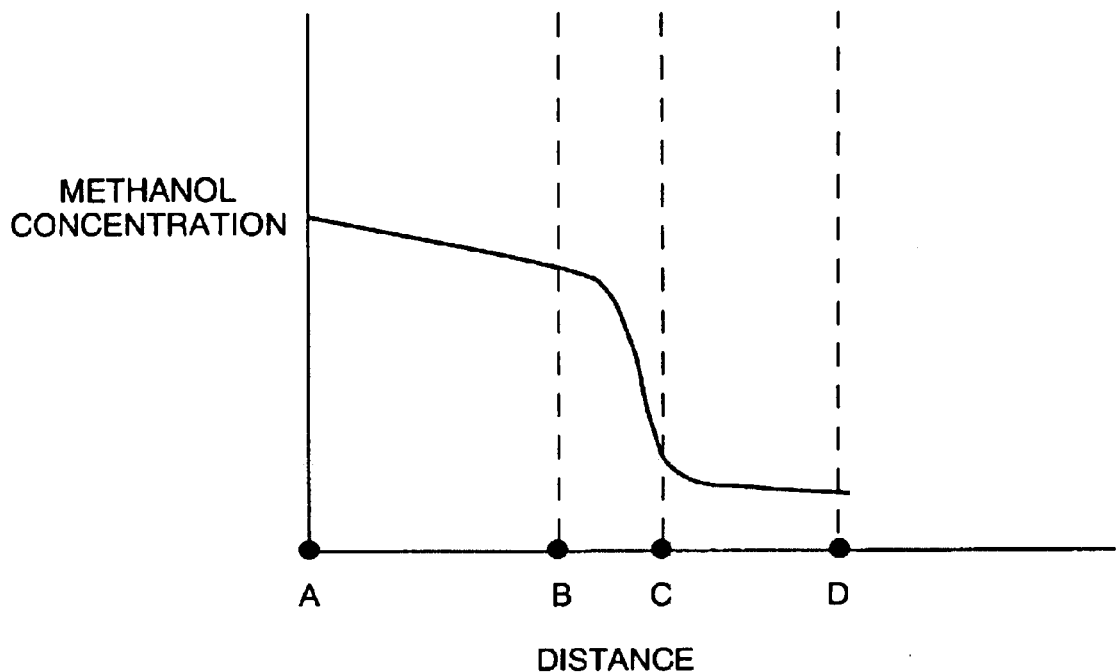
FIG. 3A is a graph showing the relative concentrations of methanol at various points denoted in FIG. 2.

Referring now to FIGS. 2 and 3A, one may see how the concentration of methanol varies at points A–D under certain operating conditions. FIG. 3A shows methanol concentrations for a typical DMFC operating at a particular output power level. As may be expected, the methanol concentration is highest at point A (i.e., the interface between flow plate 14 and GDL 16) and lowest at point D, with a significant reduction in concentration caused by the electrode 18. While the methanol concentration at point D is low, it is not zero, meaning that some methanol has crossed-over membrance electrolyte 8 and reached the cathode indicating that some methanol has passed through the membrane electrolyte without supplying current to the load.

Figure 3B:
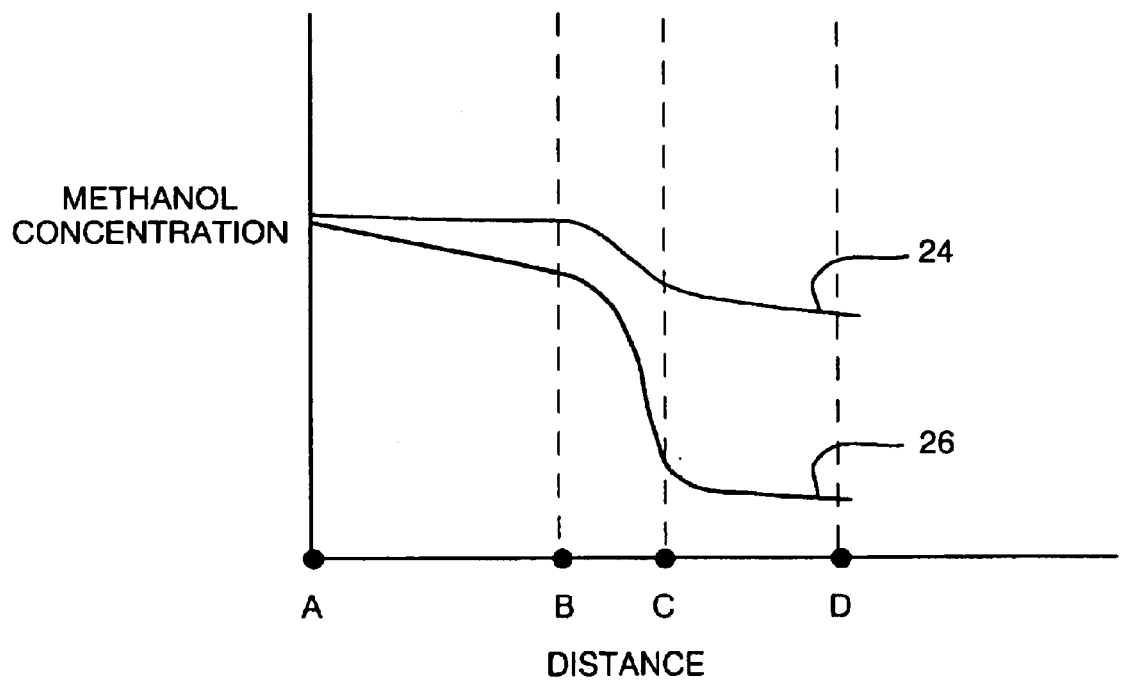
FIG. 3B is a graph showing the relative concentrations of methanol at various points denoted in FIG. 2 when the fuel cell operates at low and high output power levels.

Referring now to FIG. 3B, relative methanol concentrations at points A–D are shown for a fuel cell operating at a low output power level, denoted by reference numeral 24, and at a high power level, denoted by reference numeral 26. In the low power case, the methanol concentration at point C is significantly elevated, indicating excessive methanol cross-over and attendant loss of efficiency. In the high power case, the methanol concentration at point D is quite low, suggesting that an optimal amount or possibly insufficient methanol is being supplied to electrode 18.

Figure 4:
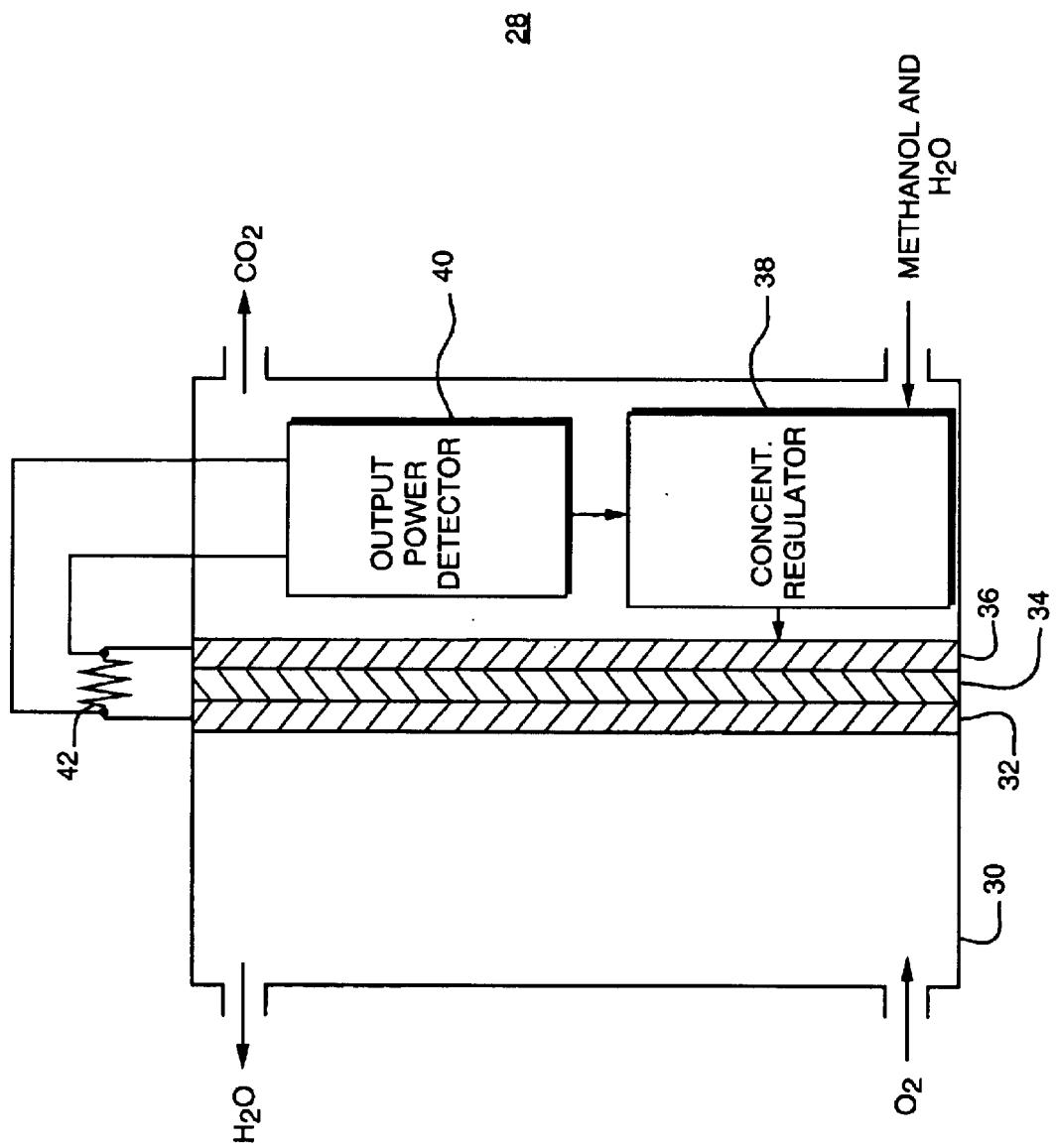
FIG. 4 is a block diagram of a direct methanol fuel cell system that includes active methanol concentration control constructed in accordance with a preferred embodiment of the present invention.

FIG. 4 shows a DMFC system 28 constructed in accordance a preferred embodiment of the present invention. A housing 30 encloses a cathode 32, membrane electrolyte 34, anode 36, a methanol concentration regulator 38 and an output power detector 40. Detector 40 functions to detect the output power level of system 28 and produce a signal (or other suitable indicator) indicative of changes in that power level to concentration regulator 38. In response to changes in the output power level, concentration regulator 38 functions to increase or decrease the concentration of methanol supplied to anode 36 such that methanol cross-over at membrane electrolyte 34 and the associated loss in efficiency are substantially minimized.

System 28 may be constructed from a variety of commercially-available materials using MEMS fabrication techniques, conventional techniques, or a combination of both.

Figure 5:
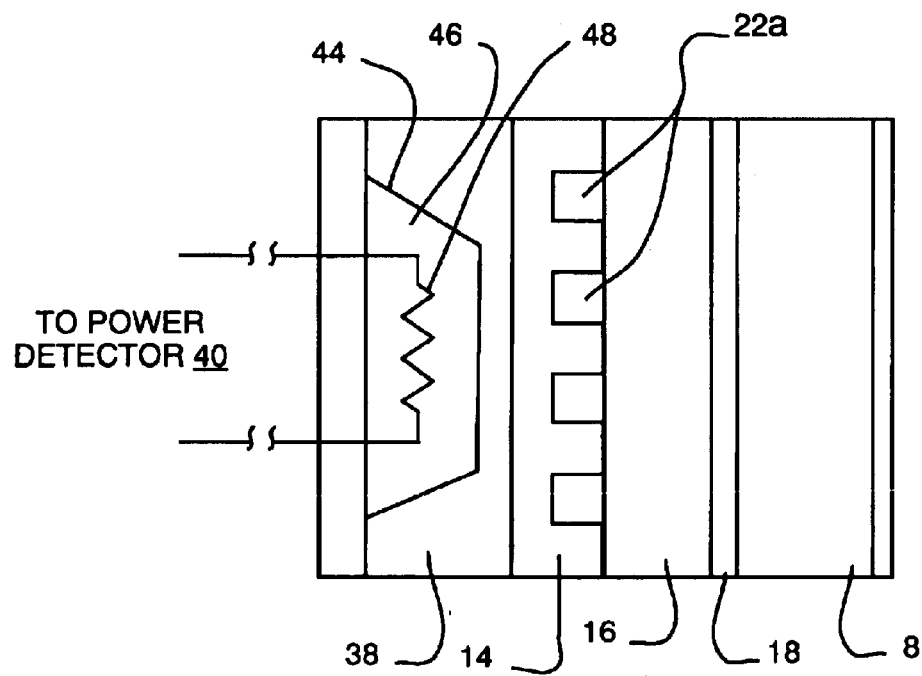
FIG. 5 is a diagram of a methanol concentration regulator constructed using MEMS fabrication techniques in accordance with one embodiment of the present invention.

FIG. 5 shows a preferred embodiment of methanol concentration regulator 38 in which the regulator is constructed as an actuator using MEMS fabrication techniques. A closed chamber 44 which is filled with a control liquid 46 may be secured to or formed integrally with flow plate 14 (FIG. 2). A resistive element 48 is disposed within liquid 46 and coupled to power detector 40. As resistive element 48 heats liquid 46, pressure is exerted on flow plate 14, GDL 16 and electrode 18, thereby reducing the flow of methanol to anode 8. Conversely, as element 48 cools, pressure is reduced and the concentration of methanol supplied to anode 8 increases.

Figure 6:
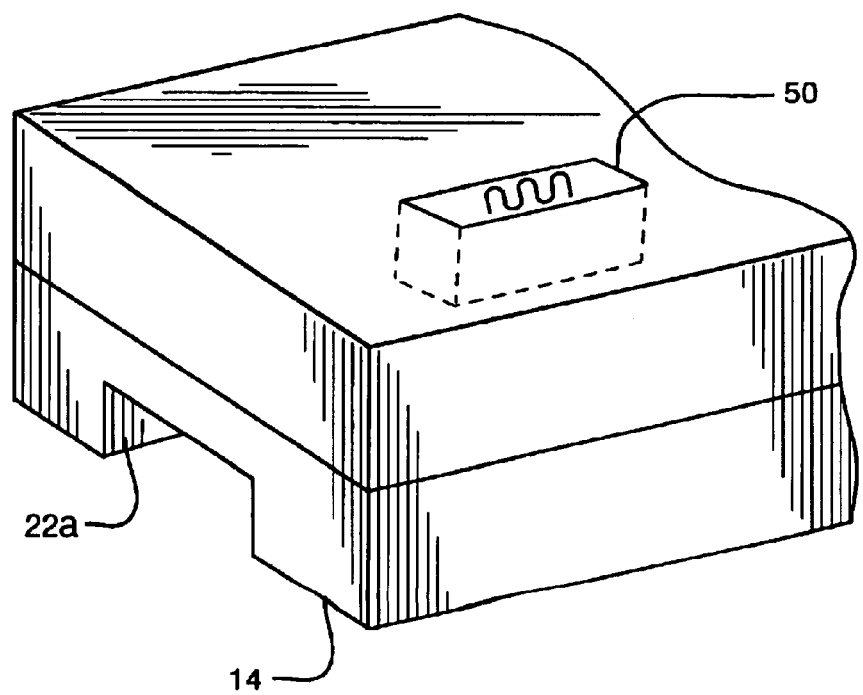
FIG. 6 is a diagram of a methanol concentration regulator constructed using MEMS fabrication techniques in accordance with an alternative embodiment of the present invention.

FIG. 6 shows an alternative embodiment of methanol concentration regulator 38. Here, a microactuator 50, which is preferably constructed using MEMS fabrication techniques, is located either proximate to or possibly within channel 22a of flow plate 14. Thus, as microactuator 50 operates, it functions to apply pressure to or reduced the cross-section of channel 22a, thereby restricting the flow of methanol through it.

Figure 7:
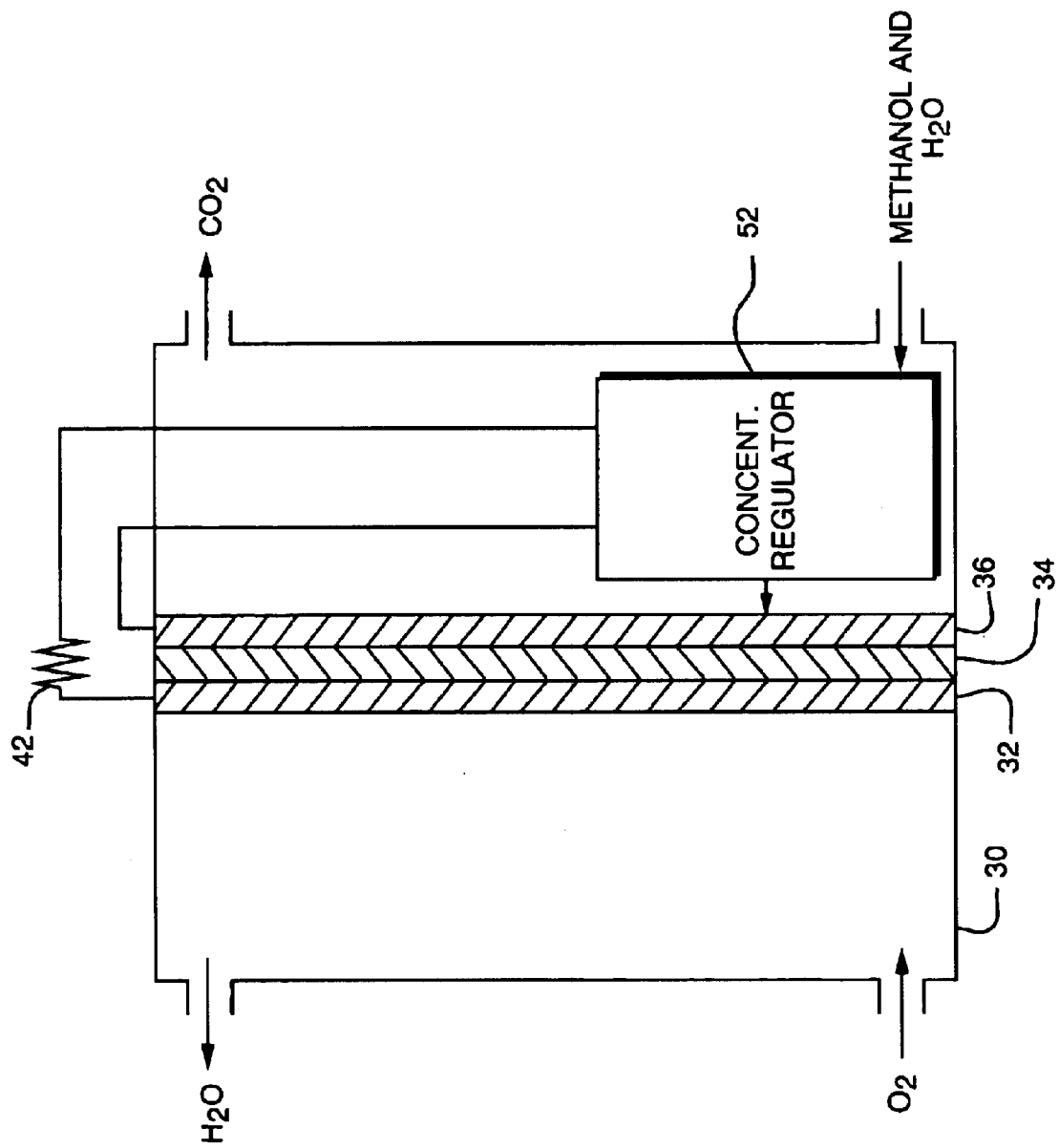
FIG. 7 is a block diagram of an alternative embodiment of the present invention in which active methanol concentration control is provided without an output power detector.

FIG. 7 shows an alternative embodiment of a DMFC system with active methanol concentration control. Components which are comparable to those shown in FIG. 4 are assigned like reference numbers. A methanol concentration regulator 52 is connected in series with load 42. In this embodiment, the output power detector has been eliminated as a discrete component, and its function is effectively integrated into the regulator. Regulator 52 is preferably implemented using a microactuator which may be constructed using a any of a variety of techniques, as described above, with an appropriate choice of material based on the expected power range for a particular application. Regulator 52, responsive to changes in potential at anode 36 or load level, operates to vary the concentration of methanol provided to the anode.

It should be understood by those skilled in the art that various other structures and techniques may be used to implement methanol concentration regulator 38, particularly those which change the porosity or tortuosity of GDL 16 or electrode 18 or both. Regulator 38 may be mechanically coupled to or integrated with either anode 8 or GDL 16. It should also be understood that the present invention may be used with fuels other than methanol/water mixtures.

What is claimed is:

1. A method of regulating a concentration of methanol in a direct methanol fuel cell system, the system including a direct methanol fuel cell being used to provide power to an application device, comprising the steps of:

using a detector to sense changes in an output power level of said fuel cell and producing a signal indicative of said changes; and using said signal to drive a concentration regulator which responsively controls the amount of methanol supplied to said fuel cell's anode in response to changes sensed in said output power level.

2. The method as in claim 1 wherein said concentration regulator is constructed using MEMS fabrication techniques.

3. The method as in claim 1 wherein said concentration regulator is constructed using non-MEMS fabrication techniques.

4. The method as in claim 1 wherein said concentration regulator is constructed using a combination of MEMS and non-MEMS fabrication techniques.

5. The method of regulating a concentration of methanol in a direct methanol fuel cell system, as defined in claim 1, including the further step of when said detector senses a low output power level of said fuel cell and said concentration regulator indicates a high concentration of methanol, using said signal to drive said concentration regulator to responsively decrease the amount of methanol supplied to said anode thereby substantially minimizing cross-over of methanol through said fuel cell's membrane electrolyte.

6. The method of regulating a concentration of methanol in a direct methanol fuel cell system, as defined in claim 1, including the further step of when said detector senses a high output power level of said fuel cell and said concentration regulator indicates a low concentration of methanol, using said signal to drive said concentration regulator to responsively increase the amount of methanol supplied to said anode thereby providing optimal methanol concentration while substantially minimizing cross-over of methanol through said fuel cell's membrane electrolyte.

7. A method of regulating a concentration of methanol in a direct methanol fuel cell system, including a direct methanol fuel cell, comprising the steps of:

using a detector to sense changes in an output power level of said fuel cell and producing a signal indicative of said changes; and using said signal to drive a concentration regulator which responsively controls the amount of methanol supplied to said fuel cell's anode in response to changes sensed in said output power level, said concentration regulator comprising a microactuator mechanically coupled to said anode and operable in response to said detector to increase or decrease a flow of methanol to said anode.

8. The method as in claim 7 wherein said microactuator comprises an enclosed chamber mechanically coupled to a flow plate which supplies methanol to said anode, said chamber being filled with a control liquid in which a resistive element is disposed, said resistive element operable in response to said detector to heat said liquid and thereby exert pressure on said flow plate, whereby the flow of methanol to said anode is varied.

9. The method as in claim 7 wherein said concentration regulator comprises a microactuator integrated with said anode.

10. The method as in claim 7 wherein said concentration regulator comprises a microactuator mechanically coupled to a gas diffusion layer and operable in response to said detector to increase or decrease a flow of methanol to said anode.

11. The method as in claim 7 wherein said concentration regulator comprises a microactuator integrated with a gas diffusion layer and operable in response to said detector to increase or decrease a flow of methanol to said anode.

12. A method of regulating a concentration of fuel in a direct oxidation fuel cell system, including a direct oxidation fuel cell being used to provide power to an application device, comprising the steps of:
  sensing changes in potential at an anode or load level of said fuel cell system; and
  using said sensed changes in potential to drive a concentration regulator which responsively controls the amount of fuel supplied to said fuel cell's anode when said power level increases and decreases, thereby minimizing cross-over of fuel through said fuel cell's membrane electrolyte.

13. The method as in claim 12 wherein said concentration regulator is constructed using MEMS fabrication techniques.

14. The method as in claim 12 wherein said concentration regulator is constructed using non-MEMS fabrication techniques.

15. The method as in claim 12 wherein said concentration regulator is constructed using a combination of MEMS and non-MEMS fabrication techniques.

16. The method of regulating a concentration of fuel in a direct oxidation fuel cell system as defined in claim 12 including the further step of
  when a change in said potential of said fuel cell indicates an increase in a high power operating fuel cell, and fuel concentration indicated by said concentration regulator is low, using said signal to drive said concentration regulator to responsively increase the amount of fuel supplied to said fuel cell's anode, to produce an optimal amount of fuel being supplied to said anode, while substantially minimizing fuel crossover.

17. The method of regulating a concentration of fuel in a direct oxidation fuel cell system as defined in claim 12 including the further step of
  when a change in said potential of said fuel cell indicates an increase in a low power operating fuel cell, and fuel concentration indicated by said concentration regulator is high, using said signal to drive said concentration regulator to responsively decrease the amount of fuel supplied to said fuel cell's anode, to substantially minimize fuel crossover.

18. A method of regulating a concentration of fuel in a direct oxidation fuel cell system comprising the steps of:
  sensing changes in potential at an anode or load level of said fuel cell system; and
  using said sensed changes in potential to drive a concentration regulator which responsively controls the amount of fuel supplied to said fuel cell's anode when said power level increases and decreases, thereby minimizing cross-over of fuel through said fuel cell's membrane electrolyte, and said concentration regulator comprising a microactuator mechanically coupled to said anode and operable in response to said detector to increase or decrease a flow of fuel to said anode.

19. The method as in claim 18 wherein said fuel is methanol and said microactuator comprises an enclosed chamber mechanically coupled to a flow plate which supplies methanol to said anode, said chamber being filled with a control liquid in which a resistive element is disposed, said resistive element operable in response to said detector to heat said liquid and thereby exert pressure on said flow plate, whereby the flow of methanol to said anode is varied.

20. The method as in claim 18 wherein said concentration regulator comprises a microactuator integrated with said anode.

21. The method as in claim 18 wherein said fuel is methanol and said concentration regulator comprises a microactuator mechanically coupled to a gas diffusion layer and operable in response to said detector to increase or decrease a flow of methanol to said anode.

22. The method as in claim 18 wherein said concentration regulator comprises a microactuator integrated with a gas diffusion layer and operable in response to said detector to increase or decrease a flow of fuel to said anode.

* * * * *